United States Patent
Murakami et al.

(10) Patent No.: US 9,992,837 B1
(45) Date of Patent: Jun. 5, 2018

(54) LIGHTING DEVICE, LUMINAIRE, AND CONTROL METHOD FOR THE LIGHTING DEVICE

(71) Applicant: Panasonic Intellectual Property Management Co., Ltd., Osaka (JP)

(72) Inventors: Shinichi Murakami, Osaka (JP); Kazuhiro Kumada, Hyogo (JP); Ryuhei Hayashi, Osaka (JP)

(73) Assignee: Panasonic Intellectual Property Management, Co., Ltd., Osaka (JP)

( * ) Notice: Subject to any disclaimer, the term of this patent is extended or adjusted under 35 U.S.C. 154(b) by 0 days. days.

(21) Appl. No.: 15/829,888

(22) Filed: Dec. 2, 2017

(30) Foreign Application Priority Data

Dec. 7, 2016 (JP) ................. 2016-238032

(51) Int. Cl.
| H05B 33/08 | (2006.01) |
| F21V 23/00 | (2015.01) |
| F21Y 115/10 | (2016.01) |
| F21W 131/406 | (2006.01) |
| F21S 8/02 | (2006.01) |

(52) U.S. Cl.
CPC ..... H05B 33/0845 (2013.01); H05B 33/0812 (2013.01); *F21S 8/026* (2013.01); *F21V 23/001* (2013.01); *F21W 2131/406* (2013.01); *F21Y 2115/10* (2016.08)

(58) Field of Classification Search
CPC ........... H05B 33/0815; H05B 33/0845; H05B 33/0812; H05B 37/02; H05B 41/26; H05B 41/38; H05B 41/3927; H02M 1/08; H02M 3/33515; H02M 5/2573; H02M 5/275; H02M 2001/0009; Y02B 20/144; Y02B 20/146
See application file for complete search history.

(56) References Cited

U.S. PATENT DOCUMENTS

| 8,669,721 B2 * | 3/2014 | Watanabe | H05B 33/0818 315/224 |
| 8,680,788 B2 * | 3/2014 | Esaki | H05B 33/0818 315/209 R |
| 9,252,662 B2 * | 2/2016 | Tischler | H05B 33/0815 |

(Continued)

FOREIGN PATENT DOCUMENTS

| JP | 2009-231147 | 10/2009 |
| JP | 2009-231640 | 10/2009 |

(Continued)

*Primary Examiner* — Haissa Philogene
(74) *Attorney, Agent, or Firm* — Renner Otto Boisselle & Sklar, LLP (57) ABSTRACT

A lighting device includes: a variable voltage source; a transistor which controls a current flowing through a light-emitting element; and a control circuit which causes the transistor to pass a current corresponding to a received instruction for a dimming level through the light-emitting element. When the received instruction instructs at least a predetermined dimming level, the control circuit causes a voltage drop in the transistor to become a first voltage by controlling the variable voltage source, and when the received instruction instructs a dimming level less than the predetermined dimming level, the control circuit causes the voltage drop to become a second voltage higher than the first voltage, by controlling the variable voltage source.

12 Claims, 4 Drawing Sheets

(56) References Cited

U.S. PATENT DOCUMENTS

| | | |
|---|---|---|
| 2012/0262080 A1 | 10/2012 | Watanabe et al. |
| 2012/0262082 A1 | 10/2012 | Esaki et al. |
| 2012/0262087 A1 | 10/2012 | Watanabe et al. |
| 2012/0286686 A1 | 11/2012 | Watanabe et al. |
| 2013/0328497 A1 | 12/2013 | Nakada et al. |

FOREIGN PATENT DOCUMENTS

| | | |
|---|---|---|
| JP | 2010-067831 | 3/2010 |
| JP | 2012-204026 | 10/2012 |
| JP | 2012-221899 | 11/2012 |
| JP | 2012-226924 | 11/2012 |
| JP | 2012-238755 | 12/2012 |
| JP | 2013-254717 | 12/2013 |
| JP | 2015-35348 | 2/2015 |
| JP | 2015-219959 | 12/2015 |

* cited by examiner

LIGHTING DEVICE, LUMINAIRE, AND CONTROL METHOD FOR THE LIGHTING DEVICE

CROSS REFERENCE TO RELATED APPLICATION

This application claims the benefit of priority of Japanese Patent Application Number 2016-238032 filed on Dec. 7, 2016, the entire content of which is hereby incorporated by reference.

BACKGROUND

1. Technical Field

The present disclosure relates to a lighting device, a luminaire including the lighting device, and a control method for the lighting device.

2. Description of the Related Art

For luminaires used for stage effects etc., performance different from ordinary luminaires is demanded. The performance referred to here is the ability to smoothly build up from a non-lighting state by fading. Here, fading is an operation to gradually change a brightness of a luminaire.

Various luminaires making fading possible have been conventionally proposed (see Patent Literature (PTL) 1 (Japanese Unexamined Patent Application Publication No. 2012-226924), for example). The luminaire of PTL 1 smoothly adjusts a current flowing through a light-emitting element, by intermittently stopping an on-off operation of a switching element for use in a DC-DC converter included in a lighting device.

SUMMARY

However, although the luminaire of PTL 1 makes ordinary fading possible, the luminaire does not make very smooth fading necessary for the stage effects etc. easy. This is because a switching power supply including a step-down chopper circuit is used in the luminaire of PTL 1, and a shift in responsiveness (a relationship between a dimming instruction value and a brightness), a rapid increase or decrease in light intensity during fading, etc., occur due to an electrolytic capacitor for anti-video flicker included in the switching power supply.

Here, it is conceivable that in order to achieve very smooth building up necessary for the stage effects etc., instead of a step-down chopper circuit, a dropper circuit which makes use of a voltage drop in a transistor is included in a lighting device. In order to reduce heat generation by a voltage drop in the transistor, a voltage drop (e.g., source-drain voltage Vds of an FET) in the transistor is caused to become a constant voltage as low as possible by controlling the lighting device including the dropper circuit.

However, when source-drain voltage Vds is caused to stay at an excessively low voltage by performing the controlling, illumination light may flicker due to an influence of a variation in drain-source voltage Vds caused by external noise. In particular, the flicker is noticeable at a low dimming level (e.g., a dimming level close to the lowest limit of dimming). In other words, the lighting device including the dropper circuit makes reducing the heat generation in the transistor and increasing a resistance to the flicker at the low dimming level conflict with each other, and has difficulty managing both of them.

In view of this, the present disclosure has an object to provide, for example, a lighting device which includes a dropper circuit that makes very smooth fading possible, and which reduces heat generation in the dropper circuit and the occurrence of a flicker even at a low dimming level.

In order to achieve the above object, a lighting device according to one aspect of the present disclosure is a lighting device which supplies power to a light-emitting element and includes: a variable voltage source which supplies a DC voltage that is variable to the light-emitting element; a transistor which is connected in series to the light-emitting element and controls a current flowing through the light-emitting element; and a control circuit which receives an instruction for a dimming level of the light-emitting element, causes the transistor to pass a current corresponding to the instruction received through the light-emitting element, and causes the variable voltage source to output the DC voltage that causes a voltage drop in the transistor to become a predetermined voltage. When the instruction received instructs at least a predetermined dimming level, the control circuit causes the voltage drop to become a first voltage by controlling the variable voltage source, and when the instruction received instructs a dimming level less than the predetermined dimming level, the control circuit causes the voltage drop to become a second voltage higher than the first voltage, by controlling the variable voltage source.

Moreover, in order to achieve the above object, a luminaire according to one aspect of the present disclosure includes a light-emitting element and the above-described lighting device which supplies power to the light-emitting element.

Moreover, in order to achieve the above object, a control method for a lighting device according to one aspect of the present disclosure is a control method for a lighting device which supplies power to a light-emitting element and includes: receiving an instruction for a dimming level of the light-emitting element, and causing a transistor to pass a current corresponding to the instruction received through the light-emitting element, the transistor being connected in series to the light-emitting element; and causing a variable voltage source to output a DC voltage that causes a voltage drop in the transistor to become a predetermined voltage, the variable voltage source supplying the DC voltage that is variable to the light-emitting element. In the causing of the variable voltage source, when the instruction received instructs at least a predetermined dimming level, the voltage drop is caused to become a first voltage by controlling the variable voltage source, and when the instruction received instructs a dimming level less than the predetermined dimming level, the voltage drop is caused to become a second voltage higher than the first voltage, by controlling the variable voltage source.

The present disclosure provides a lighting device which includes a dropper circuit making very smooth fading possible and reduces heat generation in the dropper circuit and the occurrence of a flicker even at a low dimming level, a luminaire including the lighting device, and a control method for a lighting device.

BRIEF DESCRIPTION OF DRAWINGS

The figures depict one or more implementations in accordance with the present teaching, by way of examples only.

DETAILED DESCRIPTION OF THE EMBODIMENTS

Hereinafter, embodiments of the present disclosure will be described in detail with reference to the drawings. It should be noted that each of the embodiments described below shows a specific example of the present disclosure. Therefore, numerical values, shapes, materials, structural components, the arrangement and connection of the structural components, steps, the sequence of the steps, etc. shown in the following embodiments are mere examples, and are not intended to limit the scope of the present disclosure. Furthermore, among the structural components in the following embodiments, structural components not recited in any one of the independent claims which indicate the broadest concepts of the present disclosure are described as optional structural components. Furthermore, the figures are schematic diagrams and are not necessarily precise illustrations. In the figures, substantially identical components are assigned the same reference signs, and overlapping description thereof is omitted or simplified.

Figure 1:
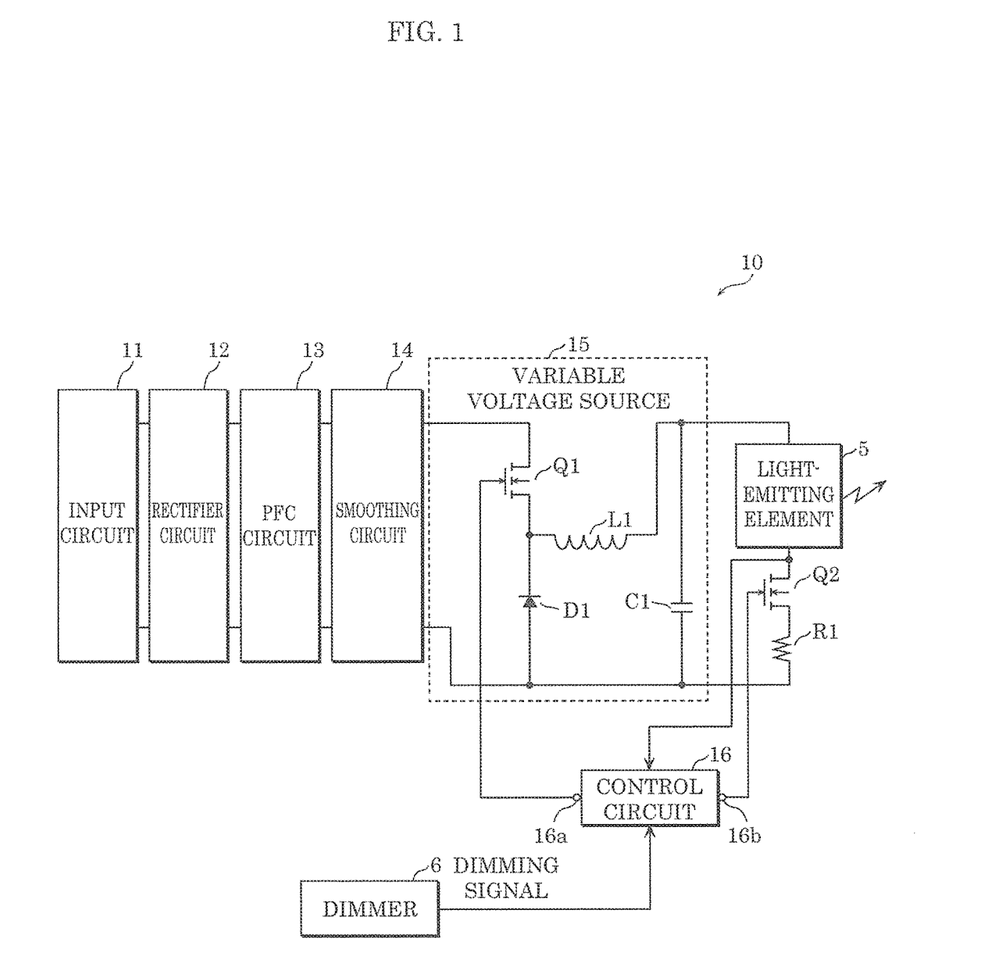
FIG. 1 is a circuit diagram illustrating a lighting device according to an embodiment.

FIG. 1 is a circuit diagram illustrating lighting device 10 according to an embodiment.

Lighting device 10 is a device which supplies power to light-emitting element 5, and is a power circuit which makes use of a dropper circuit (a voltage drop in transistor Q2). Lighting device 10 includes input circuit 11, rectifier circuit 12, power factor correction (PFC) circuit 13, smoothing circuit 14, variable voltage source 15, transistor Q2, resistor R1, and control circuit 16. It should be noted that FIG. 1 also illustrates light-emitting element 5 and dimmer 6 connected to lighting device 10.

Light-emitting element 5 is an element which emits illumination light in response to supply of current, and is, for example, a light-emitting diode (LED).

Dimmer 6 is a device which outputs, to lighting device 10 (more specifically control circuit 16), a dimming signal instructing a dimming level. Dimmer 6 includes, for example, an input device such as a dial, a slider, an operation button, and a touch panel, a detection circuit which reads an instruction from the input device, and a signal generation/output/communication circuit which outputs the instruction as a dimming signal via a wired or wireless connection.

Input circuit 11 is a circuit which receives alternating-current (AC) power, and includes, for example, a connector connected to a commercial power source, a power filter, and so on.

Rectifier circuit 12 is a circuit which converts AC power into direct-current (DC) power, and includes a bridge diode and so on.

PFC circuit 13 is, for example, a DC-DC converter.

Smoothing circuit 14 is a circuit which smoothes a pulsating voltage/current into a voltage/current similar to a DC voltage/current, and includes, for example, a capacitor, a choke coil, and so on.

Variable voltage source 15 is a power source which supplies a variable DC voltage to light-emitting element 5, and steps down a DC voltage outputted from smoothing circuit 14 to a DC voltage corresponding to a control signal received from first control terminal 16a of control circuit 16, and outputs the stepped-down DC voltage. The outputted DC voltage is applied to light-emitting element 5, transistor Q2, and resistor R1 that are connected in series.

More specifically, variable voltage source 15 is a step-down switching power supply including diode D1, inductor L1, capacitor C1, and transistor Q1. Transistor Q1 is turned on and off as a switching element according to a control signal received from first control terminal 16a of control circuit 16. When transistor Q1 is turned on, inductor L1 stores energy as a current flows through inductor L1. When transistor Q1 is turned off, inductor L1 generates an electromotive force, and a current flows through inductor L1 via diode D1. In this manner, capacitor C1 smoothes the current flowing through inductor L1, and variable voltage source 15 outputs a DC voltage.

Transistor Q2 is a transistor which is connected in series to light-emitting element 5 and controls a current flowing through light-emitting element 5, and is, for example, an n-channel MOS FET. Transistor Q2 also serves as a dropper circuit which steps down a voltage that variable voltage source 15 applies to a load (light-emitting element 5) by a voltage drop generated (a drain-source voltage).

Resistor R1 is a resistor for protection, and is, for example, a resistance element having a small resistance value.

Control circuit 16 is a circuit which controls variable voltage source 15 and transistor Q2 based on a dimming signal from dimmer 6, and is achieved by, for example, a microcomputer. The microcomputer is a one-chip semiconductor integrated circuit including a read-only memory (ROM) which stores a program, a random-access memory (RAM), a processor (CPU) which executes a program, a timer, and an input-output circuit such as an A/D converter and a D/A converter.

More specifically, when receiving an instruction (dimming signal) for a dimming level of light-emitting element 5 from dimmer 6, control circuit 16 performs the following two controls. Specifically, transistor Q2 is caused to pass a current corresponding to the received instruction through light-emitting element 5. Variable voltage source 15 is caused to output a DC voltage which causes a drop voltage in transistor Q2 to become a predetermined voltage. Specifically, when the instruction received from dimmer 6 instructs at least a predetermined dimming level, control circuit 16 causes the drop voltage in transistor Q2 to become a first voltage by controlling variable voltage source 15. In contrast, when the instruction received from dimmer 6 instructs a dimming level less than the predetermined dimming level, control circuit 16 causes the drop voltage in transistor Q2 to become a second voltage by controlling variable voltage source 15.

Control circuit 16 includes: first control terminal 16a connected to a control terminal (gate) of transistor Q1 of variable voltage source 15; and second control terminal 16b connected to a control terminal (gate) of transistor Q2. Control circuit 16 causes the voltage drop in transistor Q2 to become a predetermined voltage by controlling variable voltage source 15 via first control terminal 16a. On the other hand, control circuit 16 causes transistor Q2 via second control terminal 16b to pass the current corresponding to the instruction (dimming signal) from dimmer 6 through light-emitting element 5.

Next, operations performed by lighting device 10 according to the embodiment which is thus configured will be described. In what follows, operations performed by control circuit 16 receiving an instruction (dimming signal) from dimmer 6 will be mainly described.

When receiving an instruction (dimming signal) for a dimming level of light-emitting element 5 from dimmer 6, control circuit 16 performs the following two controls in parallel (or sequentially). Specifically, transistor Q2 is caused to pass a current corresponding to the instruction received through light-emitting element 5. Variable voltage source 15 is caused to output a DC voltage which causes a drop voltage in transistor Q2 to become a predetermined voltage.

Figure 2A:
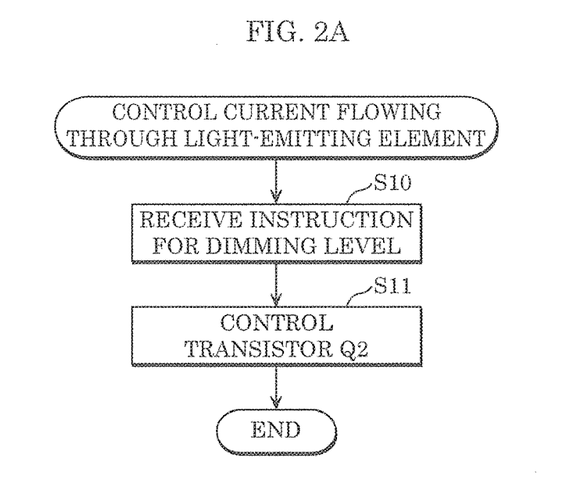
FIG. 2A is a flow chart illustrating a control on a transistor by a control circuit of the lighting device in FIG. 1.

FIG. 2A is a flow chart illustrating a control (i.e., a dimming step) on transistor Q2 by control circuit 16 of lighting device 10.

When receiving an instruction (dimming signal) for a dimming level of dimmer 6 (S10), control circuit 16 causes transistor Q2 via second control terminal 16b to pass a current corresponding to the instruction (dimming signal) from dimmer 6 through light-emitting element 5 (S11).

Specifically, control circuit 16 stores a correspondence table for instructions from dimmer 6 and voltages to be applied to the control terminal (gate) of transistor Q2, and applies a voltage corresponding to the instruction from dimmer 6 to the control terminal (gate) of transistor Q2 by reference to the correspondence table. It should be noted that by monitoring a voltage at a connection point between transistor Q2 and resistor R1 and performing a feedback control such that the voltage becomes constant, control circuit 16 may perform a constant current control such that a current flowing through resistor R1, that is, a current flowing through light-emitting element 5, becomes constant.

With such a control illustrated in FIG. 2A, the current corresponding to the instruction from dimmer 6 flows through light-emitting element 5, and a dimming control is performed.

Figure 2B:
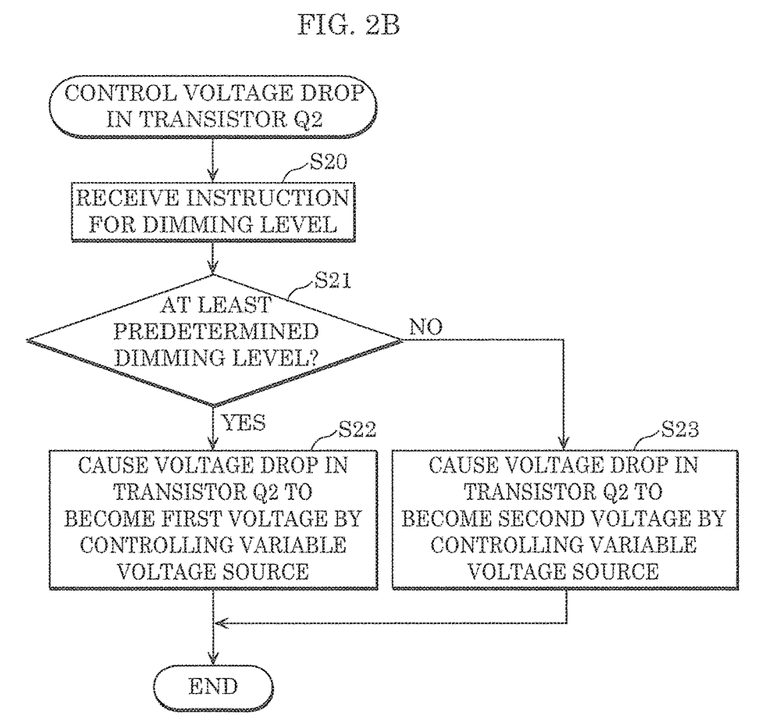
FIG. 2B is a flow chart illustrating a control on a variable voltage source by the control circuit of the lighting device in FIG. 1.

FIG. 2B is a flow chart illustrating a control (i.e., a voltage control step) on variable voltage source 15 by control circuit 16 of lighting device 10.

When receiving an instruction (dimming signal) for a dimming level from dimmer 6 (S20), control circuit 16 determines whether the instruction instructs at least a predetermined dimming level (S21).

When the instruction from dimmer 6 is determined to instruct at least the predetermined dimming level (YES in S21), control circuit 16 causes a voltage drop in transistor Q2 to become a predetermined first voltage by controlling variable voltage source 15 via first control terminal 16a (S22).

More specifically, control circuit 16 monitors, as the voltage drop in transistor Q2, a voltage at a connection point between light-emitting element 5 and transistor Q2, and performs a feedback control on transistor Q1 such that the voltage becomes a first voltage. The control on transistor Q1 is performed by, for example, changing a duty cycle of a PWM signal provided to transistor Q1, that is, changing on time in a single on-off cycle in which transistor Q1 is turned on and off.

It should be noted that the voltage at the connection point between light-emitting element 5 and transistor Q2 is strictly the sum of the voltage drop in transistor Q2 and a voltage drop in resistor R1. However, because the resistance value of resistor R1 is small, in the embodiment, control circuit 16 performs the control, assuming that the voltage at the connection point between light-emitting element 5 and transistor Q2 is the voltage drop in transistor Q2.

In contrast, when the instruction from dimmer 6 instructs a dimming level less than the predetermined dimming level (NO in S21), control circuit 16 causes a drop voltage in transistor Q2 to become a predetermined second voltage higher than the first voltage, by controlling variable voltage source 15 via first control terminal 16a (S23). Specifically, control circuit 16 monitors, as the voltage drop in transistor Q2, a voltage at the connection point between light-emitting element 5 and transistor Q2, and performs a feedback control such that the voltage becomes the second voltage.

Figure 3:
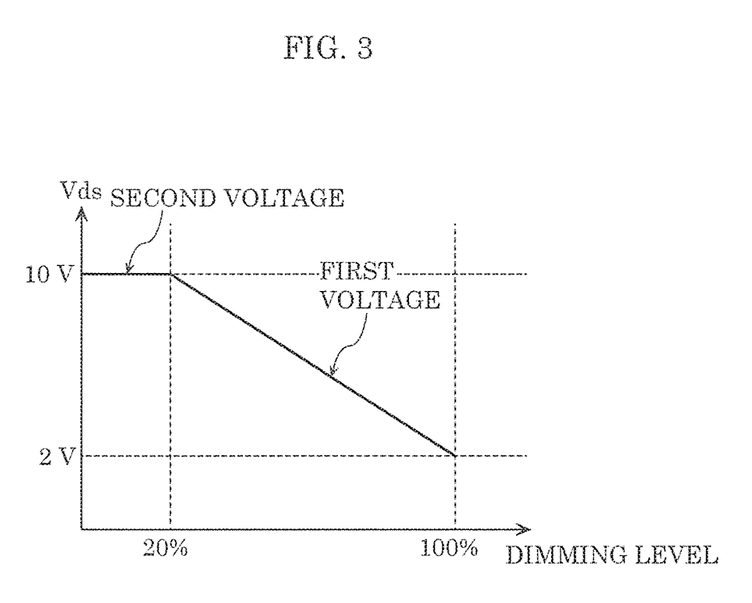
FIG. 3 is a graph illustrating an example of a relationship between a dimming level and a voltage drop in the transistor in the control illustrated by the flow chart of FIG. 2B.

FIG. 3 is a graph illustrating an example of a relationship between an instruction from dimmer 6 ("dimming level" indicated by the horizontal axis) and a voltage drop in transistor Q2 ("drain-source voltage Vds" indicated by the vertical axis) in the control illustrated by the flow chart of FIG. 2B.

In this example, when the instruction from dimmer 6 instructs at least the predetermined dimming level (20%), control circuit 16 causes drain-source voltage Vds of transistor Q2 to become the first voltage by controlling voltage variable voltage source 15 via first control terminal 16a. As illustrated in the graph, the first voltage is a downward-sloping voltage that decreases with an increase in dimming level. Specifically, drain-source voltage Vds becomes 10V when the dimming level is 20%; decreases with the increase in dimming level; and becomes 2V when the dimming level is 100%. Accordingly, in the case of at least the predetermined dimming level that may cause problematic heat generation by a large current flowing through light-emitting element 5, the voltage drop in transistor Q2 is maintained at the first voltage that is relatively low.

In contrast, when the instruction from dimmer 6 instructs a dimming level less than the predetermined dimming level (20%), control circuit 16 causes the voltage drop in transistor Q2 to become the predetermined second voltage (10V) higher than the first voltage, by controlling variable voltage source 15 via first control terminal 16a. Here, the second voltage is a constant value (10V) independent of a dimming level. Accordingly, in the case of the dimming level less than the predetermined dimming level that causes no problematic heat generation, the voltage drop in transistor Q2 is maintained at the second voltage that is relatively high and less likely to be influenced by external noise (i.e., less likely to cause a flicker).

It should be noted that a value (%) of a dimming level corresponds to a brightness. For example, full illumination (the maximum brightness) is indicated by 100%, and a non-illumination state is indicated by 0%.

With such a control illustrated in FIG. 2B and FIG. 3, the voltage drop in transistor Q2 is controlled according to the instruction from dimmer 6, the heat generation in the dropper circuit (transistor Q2) is reduced, and the occurrence of the flicker is reduced even at the low dimming level.

As described above, lighting device 10 according to the embodiment is a lighting device which supplies power to light-emitting element 5 and includes: variable voltage source 15 which supplies a DC voltage that is variable to light-emitting element 5; transistor Q2 which is connected in series to light-emitting element 5 and controls a current flowing through light-emitting element 5; and control circuit 16 which receives an instruction for a dimming level of light-emitting element 5, causes transistor Q2 to pass a current corresponding to the instruction received through light-emitting element 5, and causes variable voltage source 15 to output the DC voltage that causes a voltage drop in transistor Q2 to become a predetermined voltage. When the received instruction instructs at least a predetermined dimming level, control circuit 16 causes the voltage drop to become a first voltage by controlling variable voltage source 15, and when the received instruction instructs a dimming level less than the predetermined dimming level, control circuit 16 causes the voltage drop to become a second voltage higher than the first voltage, by controlling variable voltage source 15.

With this, in lighting device 10 including the dropper circuit, in the case of at least the predetermined dimming level that may cause problematic heat generation by a large current flowing through light-emitting element 5, the voltage drop in transistor Q2 is maintained at the first voltage that is relatively low. In contrast, in the case of the dimming level less than the predetermined dimming level that causes no problematic heat generation, the voltage drop in transistor Q2 is maintained at the second voltage that is relatively high and less likely to be influenced by external noise. Accordingly, the lighting device is achieved which includes the dropper circuit that makes very smooth fading necessary for the stage effects etc. possible, and reduces the heat generation in the dropper circuit and the occurrence of a flicker even at the low dimming level.

Moreover, control circuit 16 includes first control terminal 16a connected to variable voltage source 15; and second control terminal 16b connected to transistor Q2. In addition, control circuit 16: controls variable voltage source 15 via first control terminal 16a such that the voltage drop becomes the predetermined voltage; and causes transistor Q2 via second control terminal 16b to pass the current corresponding to the instruction received through light-emitting element 5.

With this, control circuit 16 may control variable voltage source 15 via one of the two control terminals, and transistor Q2 via the other of the two control terminals. Accordingly, the simple control reduces the heat generation in the dropper circuit and the occurrence of the flicker at the low dimming level.

Moreover, the first voltage is a value that decreases with an increase in the dimming level instructed by the instruction received.

With this, the voltage drop in transistor Q2 is caused to decrease with an increase in a current flowing through transistor Q2 via light-emitting element 5. As a result, an increase in the heat generation in transistor Q2 when the dimming level is high is reduced.

Moreover, the second voltage is a constant value independent of the dimming level instructed by the instruction received.

With this, when a current flowing through transistor Q2 via light-emitting element 5 is low, the voltage drop in transistor Q2 may be maintained constant independent of the current flowing through transistor Q2. As a result, the control on transistor Q2 is simplified.

Moreover, a control method for lighting device 10 according to the embodiment is a method for supplying power to light-emitting element 5, the method including: receiving an instruction for a dimming level of light-emitting element 5, and causing transistor Q2 to pass a current corresponding to the instruction received through light-emitting element 5, transistor Q2 being connected in series to light-emitting element 5; and causing variable voltage source 15 to output a DC voltage that causes a voltage drop in transistor Q2 to become a predetermined voltage, variable voltage source 15 supplying the DC voltage that is variable to light-emitting element 5. In the causing of variable voltage source 15, when the instruction received instructs at least a predetermined dimming level, the voltage drop is caused to become a first voltage by controlling variable voltage source 15, and when the instruction received instructs a dimming level less than the predetermined dimming level, the voltage drop is caused to become a second voltage higher than the first voltage, by controlling variable voltage source 15.

With this, in lighting device 10 including the dropper circuit, in the case of at least the predetermined dimming level that may cause problematic heat generation by a large current flowing through light-emitting element 5, the voltage drop in transistor Q2 is maintained at the first voltage that is relatively low. In contrast, in the case of the dimming level less than the predetermined dimming level that causes no problematic heat generation, the voltage drop in transistor Q2 is maintained at the second voltage that is relatively high and less likely to be influenced by external noise. Accordingly, the lighting device is achieved which includes the dropper circuit that makes very smooth fading necessary for the stage effects etc. possible, and reduces the heat generation in the dropper circuit and the occurrence of a flicker even at the low dimming level.

Figure 4A:
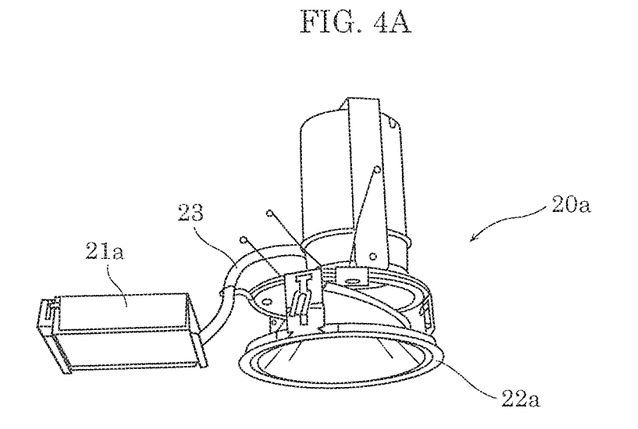
FIG. 4A is an external view illustrating an example (downlight) of a luminaire according to the embodiment.
Figure 4B:
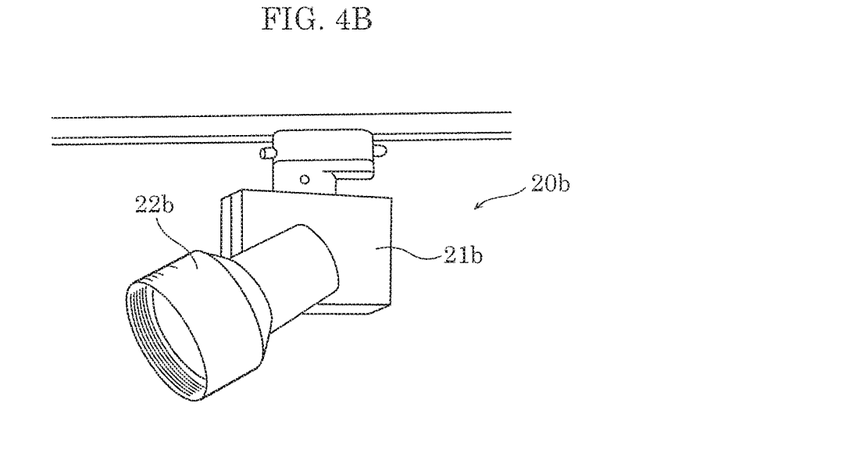
FIG. 4B is an external view illustrating another example (spotlight) of the luminaire according to the embodiment.

FIG. 4A and FIG. 4B are external views of luminaires 20a and 20b according to the embodiment, respectively.

Luminaire 20a illustrated in FIG. 4A is a downlight used for the stage effects etc., and includes circuit box 21a, lamp body 22a, and wire 23. Circuit box 21a is a metal box which houses lighting device 10 (not shown) according to the embodiment. Lamp body 22a is a fixture to which an LED (not shown) that is light-emitting element 5 is attached and which is fixed by being embedded in a ceiling etc. Wire 23 is a cable which electrically connects lighting device 10 in circuit box 21a and the LED in lamp body 22a.

Luminaire 20b illustrated in FIG. 4B is a spotlight used for the stage effects etc., and includes circuit box 21b and lamp body 22b. Circuit box 21b is a metal box which houses lighting device 10 (not shown) according to the embodiment and is attached to a dedicated rail etc. Lamp body 22b is a fixture to which an LED (not shown) that is light-emitting element 5 is attached.

Such luminaires 20a and 20b each include light-emitting element 5 and lighting device 10 according to the embodiment which supplies power to light-emitting element 5.

With this, in lighting device 10 included in each of luminaires 20a and 20b, the dropper circuit is used, and in the case of at least the predetermined dimming level that may cause problematic heat generation by a large current flowing through light-emitting element 5, the voltage drop in transistor Q2 is maintained at the first voltage that is relatively low. In contrast, in the case of the dimming level less than the predetermined dimming level that causes no problematic heat generation, the voltage drop in transistor Q2 is maintained at the second voltage that is relatively high and less likely to be influenced by external noise. Accordingly, the luminaire is achieved which includes the lighting device that makes very smooth fading necessary for the stage effects etc. possible, and which reduces the heat generation in the dropper circuit and the occurrence of a flicker even at the low dimming level.

Although lighting device 10 and luminaires 20a and 20b according to the present disclosure have been described based on the embodiment, the present disclosure is not limited to the embodiment. Forms obtained by various modifications to the embodiment that can be conceived by a person skilled in the art as well as other forms realized by optionally combining some of the structural components in the embodiment which are within the scope of the essence of the present disclosure are included in the present disclosure.

For example, although light-emitting element 5 is the LED in the aforementioned embodiment, the present disclosure is not limited to this. Another light-emitting element such as an organic electroluminescence (EL) element may be the LED.

Moreover, although lighting device 10 includes input circuit 11, rectifier circuit 12, PFC circuit 13, and smoothing circuit 14 in the aforementioned embodiment, these circuits may be optional. Lighting device 10 may be, for example, a power circuit which includes none of the circuits and receives DC voltage from a battery.

Moreover, although variable voltage source 15 is the step-down switching power supply in the aforementioned embodiment, the present disclosure is not limited to this. Variable voltage source 15 may be any voltage source such as a linear regulator as long as the voltage source is a DC voltage source capable of changing an output voltage according to an external control signal.

Moreover, although resistor R1 for protection is used in lighting device 10 in the aforementioned embodiment, resistor R1 is optional and may not be omitted depending on required specifications.

Moreover, control circuit 16 is implemented through software by a microcomputer having a program in the aforementioned embodiment. However, the implementation method is not limited to such, and control circuit 16 may be implemented through hardware by a dedicated electronic circuit including an A/D converter, a logic circuit, a gate array, a D/A converter, etc.

Moreover, the first voltage used in control circuit 16 is a value that decreases with the increase in dimming level in the aforementioned embodiment. However, the first voltage is not limited to this, and may be a voltage that stays constant independent of a dimming level, a voltage that decreases in a staircase pattern with the increase in dimming level, a voltage that curvilinearly decreases with the increase in dimming level, or the like, as long as any of these voltages is lower than the second voltage.

Moreover, the second voltage used in control circuit 16 is a constant voltage independent of a dimming level in the aforementioned embodiment. However, the second voltage is not limited to this, and may be a value that decreases with the increase in dimming level, like the first voltage, as long as the value is a voltage higher than the first voltage.

Moreover, although luminaires 20a and 20b are the downlight and the spotlight, respectively, in the aforementioned embodiment, luminaires 20a and 20b are not limited to these types, and may be other types of luminaire such as a ceiling light, a chandelier, a pendant light, and a flat light.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting device which supplies power to a light-emitting element, the lighting device comprising:
   a variable voltage source which supplies a DC voltage that is variable to the light-emitting element;
   a transistor which is connected in series to the light-emitting element and controls a current flowing through the light-emitting element; and
   a control circuit which receives an instruction for a dimming level of the light-emitting element, causes the transistor to pass a current corresponding to the instruction received through the light-emitting element, and causes the variable voltage source to output the DC voltage that causes a voltage drop in the transistor to become a predetermined voltage,
   wherein when the instruction received instructs at least a predetermined dimming level, the control circuit causes the voltage drop to become a first voltage by controlling the variable voltage source, and when the instruction received instructs a dimming level less than the predetermined dimming level, the control circuit causes the voltage drop to become a second voltage higher than the first voltage, by controlling the variable voltage source.

2. The lighting device according to claim 1,
   wherein the control circuit includes a first control terminal connected to the variable voltage source; and a second control terminal connected to the transistor, and the control circuit: controls the variable voltage source via the first control terminal such that the voltage drop becomes the predetermined voltage; and causes the transistor via the second control terminal to pass the current corresponding to the instruction received through the light-emitting element.

3. The lighting device according to claim 1,
   wherein the first voltage is a value that decreases with an increase in the dimming level instructed by the instruction received.

4. The lighting device according to claim 3,
   wherein the second voltage is a constant value independent of the dimming level instructed by the instruction received.

5. The lighting device according to claim 1,
   wherein the second voltage is a constant value independent of the dimming level instructed by the instruction received.

6. The lighting device according to claim 1,
   wherein the variable voltage source supplies the DC voltage to a series circuit including at least the light-emitting element and the transistor.

7. The lighting device according to claim 1,
   wherein the control circuit: monitors a voltage at a connection point between the light-emitting element and the transistor; causes the transistor to pass the current corresponding to the instruction received through the light-emitting element, using the voltage at the connection point as feedback information; and causes the voltage drop in the transistor to become the predetermined voltage by controlling the variable voltage source.

8. The lighting device according to claim 1,
   wherein the variable voltage source is a step-down switching power supply.

9. A luminaire comprising:
a light-emitting element; and
the lighting device according to claim 1 which supplies the power to the light-emitting element.

10. A lighting device which supplies power to a light-emitting element, the lighting device comprising:
a variable voltage source which supplies a DC voltage that is variable to the light-emitting element;
a transistor which is connected in series to the light-emitting element and controls a current flowing through the light-emitting element; and
a control circuit which receives an instruction for a dimming level of the light-emitting element and causes the transistor to pass a current corresponding to the instruction received through the light-emitting element,
wherein when the instruction received instructs at least a predetermined dimming level, the control circuit causes a voltage drop in the transistor to become a first voltage by controlling the variable voltage source, and when the instruction received instructs a dimming level less than the predetermined dimming level, the control circuit causes the voltage drop to become a second voltage higher than the first voltage, by controlling the variable voltage source.

11. A luminaire comprising:
a light-emitting element; and
the lighting device according to claim 10 which supplies the power to the light-emitting element.

12. A control method for a lighting device which supplies power to a light-emitting element, the control method comprising:
receiving an instruction for a dimming level of the light-emitting element, and causing a transistor to pass a current corresponding to the instruction received through the light-emitting element, the transistor being connected in series to the light-emitting element; and
causing a variable voltage source to output a DC voltage that causes a voltage drop in the transistor to become a predetermined voltage, the variable voltage source supplying the DC voltage that is variable to the light-emitting element,
wherein in the causing of the variable voltage source, when the instruction received instructs at least a predetermined dimming level, the voltage drop is caused to become a first voltage by controlling the variable voltage source, and when the instruction received instructs a dimming level less than the predetermined dimming level, the voltage drop is caused to become a second voltage higher than the first voltage, by controlling the variable voltage source.

\* \* \* \* \*